Feb. 7, 1939. O. G. BURCH 2,146,171
TOASTER
Filed April 29, 1938 2 Sheets-Sheet 1
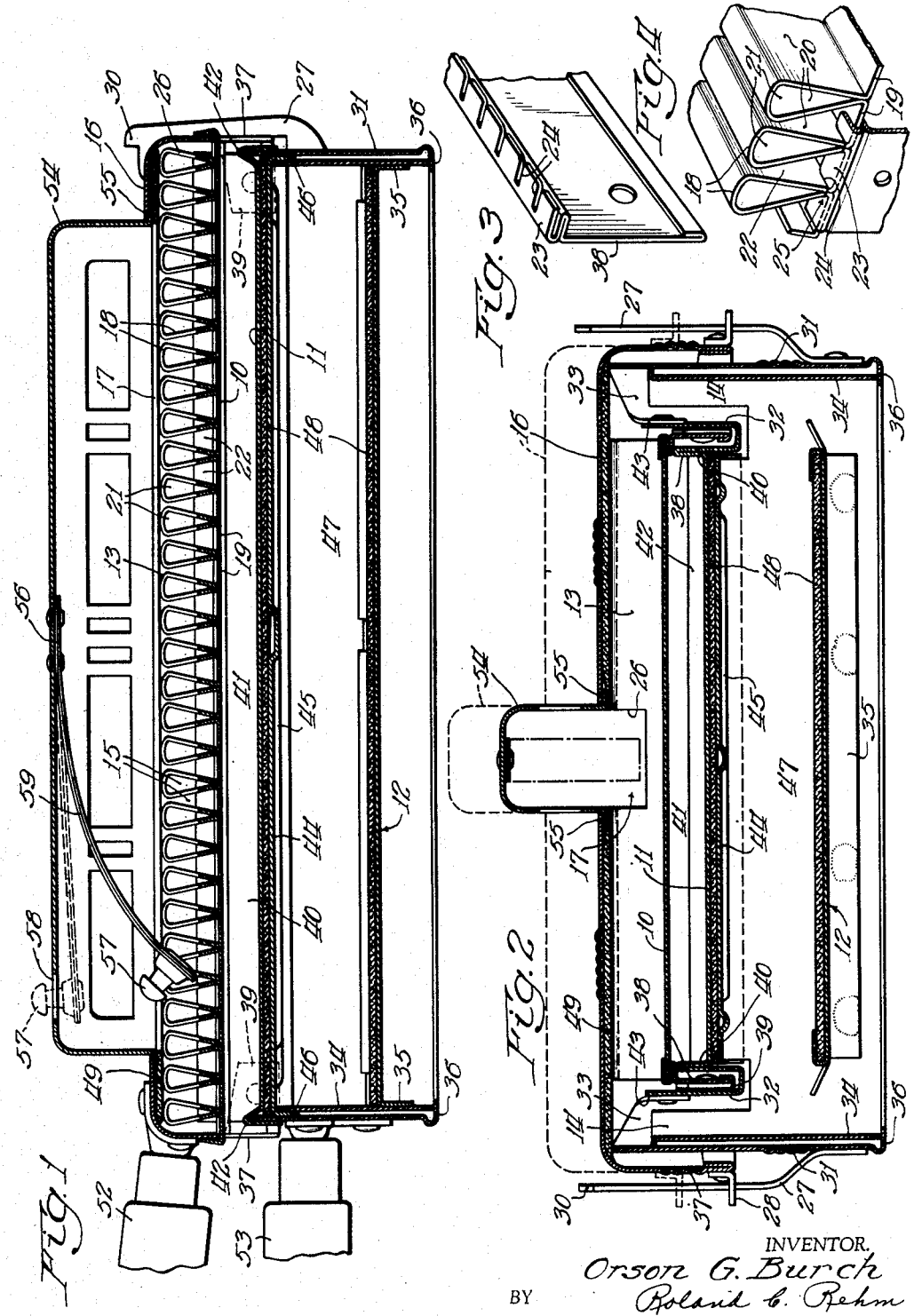
INVENTOR.
Orson G. Burch
Roland C. Rehm
BY
ATTORNEY.

Feb. 7, 1939.   O. G. BURCH   2,146,171
TOASTER
Filed April 29, 1938   2 Sheets-Sheet 2
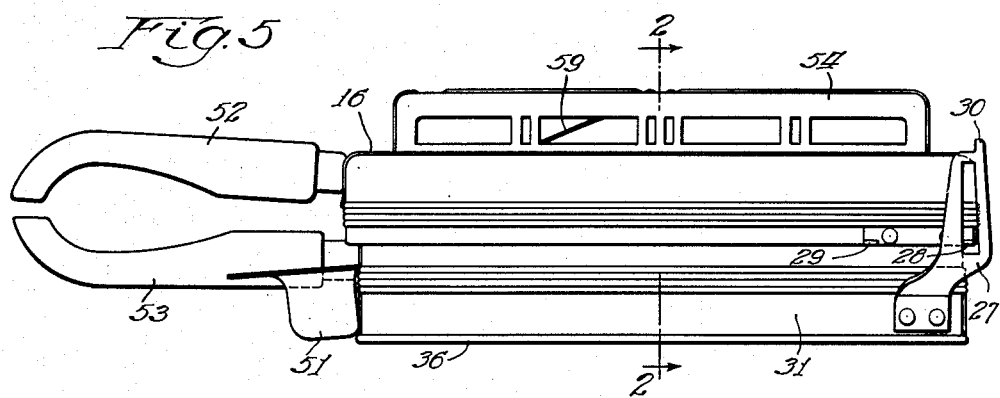
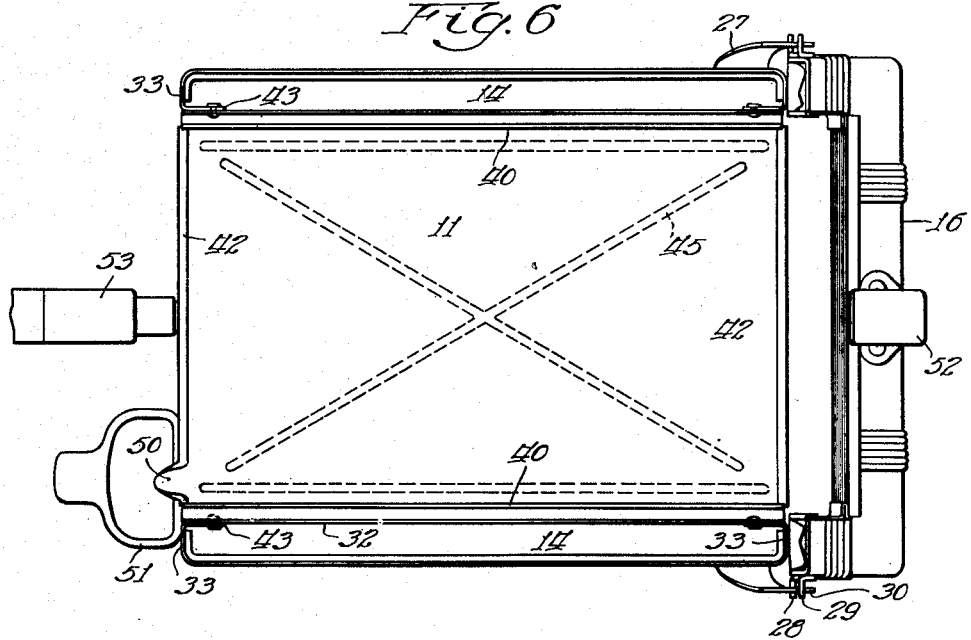
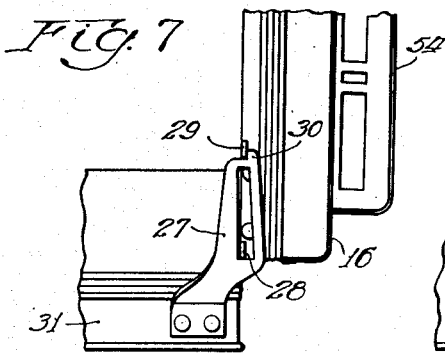
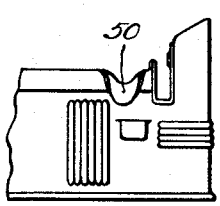
INVENTOR.
Orson G. Burch
Roland C. Rehm
BY
ATTORNEY.

Patented Feb. 7, 1939

2,146,171

UNITED STATES PATENT OFFICE 2,146,171

TOASTER

Orson G. Burch, Detroit, Mich.

Application April 29, 1938, Serial No. 205,066

21 Claims. (Cl. 53—5)

This invention relates to grills, toasters, and the like and, among other objects, aims to produce a practical and efficient device of this character particularly adapted to be operated by hot gases and to apply heat furnished by hot gases equally and uniformly to opposite faces of the bread, sandwich, or other food to be prepared.

The nature of the invention may be readily understood by reference to one illustrative embodiment thereof shown in the accompanying drawings.

In said drawings:

Fig. 1 is a vertical longitudinal section of the device;

Fig. 2 is a transverse vertical section thereof taken approximately on the plane 2—2 of Fig. 5;

Figs. 3 and 4 are perspective views of details of the upper toaster plate;

Fig. 5 is a side elevation of the device when closed;

Fig. 6 is a plan view thereof when open, i. e. with the top section raised;

Fig. 7 is a detail of the hinge connection for the upper and lower sections;

Fig. 8 is a front elevation showing a detail of the drip spout; and

Fig. 9 is an elevation of a drip cup.

The invention is here shown embodied in a toaster or grill for use over an open flame, such as a gas burner, where the heat is mainly in the form of hot gases. The device is particularly suited for toasting bread and sandwiches and for baking or grilling other foods, such as pancakes, waffles, breads, and meat, simultaneously on opposite faces. For the sake of simplicity, the expression "toaster" will be used hereinafter in a generic sense to include devices such as bakers and grills having similar functions.

Heat is delivered to the opposite faces of the food (which for convenience will hereafter be referred to generically as bread and toast) by upper and lower toaster plates 10 and 11 which are equally heated by the hot gases and conduct the same to the bread. For most uses these plates are provided with flat toaster surfaces. For some uses, however, such as for baking waffles, they should be given an appropriate configuration.

The means for equalizing heat delivery to the upper and lower plates comprise in this instance a heat retarding device in the form of baffle 12 which lies between the source of heat (such as an open gas flame) and the bottom plate 11, and heat absorbing fins 13 or the like which absorb heat from the hot gases and conduct it directly to the top plate 10. The hot gases are conducted to the fins by passages 14 and caused to contact effectively therewith by the passages 15 between the top 16 of the device and the top plate 10. The outlet 17 for the gases is located at a point remote from the passages 14 (in this instance along the center line of the top) and the gases are therefore brought into contact with the heat absorbing fins 13 over the entire area of the top plate 10. The fins are here shown formed to provide a plurality of channels or passages leading from the passages 14 to the outlet, thereby preventing short circuiting of the gases and insuring uniform distribution of heat to the top toaster plate. The top plate is advantageously made of a metal, such as aluminum, having a high coefficient of heat conductivity, and the heat absorbing fins should have an intimate metallic contact with the plate to effect an efficient transfer thereto of the heat absorbed by the fins from the gases. Maximum efficiency results if the fins, as in this instance, be integral with the plate.

As here shown, (Fig. 1) the top plate 10 is made of a single sheet of aluminum of about .016" gauge, corrugated to provide upwardly extending loops 18 joined by flat sections 19 which, when pressed into contact, form in effect a continuous flat toaster surface for the plate 10. The walls 20 of the loops 18 diverge and closely approach those of adjacent loops, thereby providing a series of passages 21 and 22 of triangular section for conducting the hot gases across the plate to the center outlet. Thus during the travel of the gases to the center outlet they are practically completely surrounded by metal surfaces integral with the plate 10. This insures a maximum heat absorption. The flat sections 19 are held in contiguous relationship by a keeper 23 provided with a series of slots 24 which straddle the bases of the corrugations at 25 (Figs. 3 and 4). The loops 18 are partly cut away as at 26 (Fig. 2) in registry with the outlet passage 17 to facilitate escape of the gases from the passages 21 and 22.

Plates for waffles and other foods requiring a complex baking surface may advantageously be cast from aluminum. The heat absorbing fins in the form of gas passages or otherwise may be cast integral with the top plate.

The upper section comprising the top plate 10 and its cover 16 is so hinged to the bottom section comprising the bottom plate and its housing that the top plate may lie in contact with the toast, sandwiches, etc., regardless of their thickness. The capacity of the top plate to be further elevated above lower plate 11 is illustrated in dotted lines in Fig. 2. The hinge connection, in this instance, is provided by a conventional slotted bracket 27 in the slots of which the projecting hinge member 28 carried by the cover travels (see Figs. 2 and 7). Another projection 29 carried by the cover serves, when in engagement with the stop 30 on the hinge bracket, to check the cover and hold it in upright position.

The gas passages 14 are designed to be elongated or to be contracted in accordance with the relative spacing of the top and bottom toaster plates (to accommodate toast of varying thickness), and in this instance are enclosed by telescoping walls (Fig. 2). The lower sections of the passages 14 are provided by the skirt 31 which surrounds the base of the device and functions both as a support and as a hood for preventing lateral escape of the heated gases. The inner walls of the passage are provided by flanges 32 connected to and rising upwardly from the bottom toaster plate 11 and connected to the outer walls by end walls 33. Preferably a heavy sheet metal liner 34 lines the inside faces of the skirt 31 to protect the latter from excessive heat which might discolor the polished decorative outer surfaces of the latter. The ends of the baffle 12 are provided with downwardly extending flanges 35 which are connected by spot-welding or otherwise to the liner 34 by means of which it is supported in proper position (Fig. 1). The lower edges of the liner 34 rest on the inwardly turned flanges 36 of the skirt.

The upper section of the passages 14 is formed by flanges 37 which, in this instance, are integral with the cover 16 and extend downwardly along its side edges. The inner wall of the upper section of the passage is provided with flanges 38 downwardly projecting from top plate 10, and, in this instance, being integral with the keepers 23. Flanges 37 and 38 pass on the outside of the flanges 32 and the skirt 31. The ends of the upper section of the passage are closed by continuing the flanges 37 of the cover around the ends of the top and connecting tabs 39 thereof by rivets or otherwise with the downwardly projecting flange 38 (Fig. 1).

The bottom plate 11 is preferably flanged as at 40 along its side edges to provide a relatively deep groove (Fig. 2) which receives the downwardly projecting flanges 38 and provides an additional baffle to prevent entrance of gases from passages 14 into the toasting space 41. The front and rear edges of the plate 11 are also advantageously upwardly flanged as at 42 to prevent the uncontrolled escape of grease, batter, or other fluid substances. As here shown (Figs. 1 and 2), the flanges 32, 40 and 42 are formed integral with plate 11 simply by doubling over the margins thereof and bending the same to form the channels which receive flanges 38. The extremities of the flanges 32 may be connected by riveting or otherwise to tabs 43 integral with and being inwardly of the ends 33 of the skirt (Figs. 1 and 2). The bottom plate is also advantageously made of a metal having a high coefficient of conductivity, such as aluminum.

In this instance it is stiffened and reinforced by a sheet metal supporting plate 44 in which reinforcing and stiffening ribs 45 have been pressed. The plate rests upon and is supported by the front and rear ends of the liner 34 and is provided with downwardly projecting end flanges 46 which project downwardly over the outer faces of the liner. The supporting plate 44 serves also to effect a more uniform distribution of the heat which is transmitted to the bottom plate by hot gases entering the space 47 and by a very small amount of radiant heat which passes directly through the baffle 12. Both the subplate 44 and the baffle 12 are advantageously faced with sheets 48 of refractory insulating material, such as asbestos, to minimize the amount of heat transmitted to the bottom plate 11 directly through the baffle and to secure greater uniformity of distribution of the heat. The side edges of baffle 12 are advantageously flared upwardly in the passage 14 (see Fig. 2) to reduce the volume of hot gases entering the space 47 below the bottom plate 11.

The inner face of the cover 16 is also advantageously protected by a sheet 49 of refractory insulating material such as asbestos. This avoids loss of heat and protects the decoratively polished top plate from discoloration from heat.

One edge, preferably the front edge of the plate, is provided with a spout or lip 50 by means of which grease and other undesired liquid substances may escape. A removable cup 51 is located under the spout 50. For pancakes, waffles, etc., the spout should be eliminated or closed. The flanges around the bottom plate function to retain batter, etc., against escape.

Handles 52 and 53 advantageously project from the front edge of the upper and lower sections of the device and are so designed that both may be grasped as a single handle in placing and moving the device (Fig. 5). The upper section is hinged open and closed by the upper handle 52.

The outlet passage 17 is advantageously housed by a cover 54 slotted along its sides to permit escape of gases. As here shown, the cover projects through a slot in the top 16. Its lower edges are provided with flanges 55 which are clamped between the fins on the top plate 10 and the inner face of the cover 16 (Fig. 2).

Inside the cover a heat indicator may advantageously be placed to serve as a guide in regulating heat applied to the toaster. The thermostatic device is, in this instance, in the form of a bi-metallic strip 59 connected by riveting or otherwise at 56 to the top of the cover and carrying at its other end a projection 57 adapted to project through the hole 58 in the cover when the toaster has been raised to proper temperature, and thus serve as an indicator for proper regulation of the temperature.

After the device has been brought to proper temperature, the supply of heat is reduced to an amount which is sufficient simply to maintain the desired temperature. If heat be supplied by a gas burner, the gas flame is lowered appropriately. When thus adjusted, there is little danger of burning or scorching the food if it be allowed to remain longer than necessary in the device. This advantageous characteristic results from the use of low temperature heating gases as contrasted with radiant heat from a glowing or incandescent source, as in electric toasters. It is also difficult to secure uniform temperature or distribution of radiant heat. Radiant heat varies approximately as the 4th power of the temperature of the source of heat. The slight and wholly uncontrollable variations in temperature which inevitably occur in such a source of heat, therefore, produce wide variations in the heat delivered. In toasters of this character, radiant heat emanates from a series of points and there is, therefore, a corresponding unequal distribution of heat. When the heat is applied by relatively low temperature gases, as in the present device, it may be uniformly applied. Burning of the food and temperature fluctuation of the toaster plates are avoided.

This case is a continuation in part of my copending application, Serial No. 183,597.

Obviously the invention is not limited to the details of the illustrative device herein described since these may be variously modified. Moreover it is not necessary that all features of the invention be used conjointly since various features may be used to advantage in different combinations and sub-combinations.

Having described my invention, I claim:

1. A device of the character described comprising in combination upper and lower heating plates adapted to be placed in contact with opposite sides of the food to be prepared, means for supporting said plates over a source of hot gases, means for conducting the hot gases across the top of said upper plate, and heat absorbing means associated with said upper plate for absorbing heat from said hot gases and conducting it to said upper plate.

2. A toaster of the character described comprising in combination a pair of heating plates adapted to be placed in contact with the opposite sides of the food to be prepared, a housing surrounding each of said plates, hinges for connecting said housings and their respective plates, passages in said housings for conducting heated gases to the outer faces of the respective plates, the passages in one housing communicating with those in the other whereby heated gases from one housing are conducted into the other housing.

3. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and means for hingedly connecting said plates to permit the latter to swing apart and to adjust themselves to varying thickness of the food between them.

4. A toaster of the character described comprising in combination upper and lower metallic heating plates adapted to supply heat from their faces to the food between them, the lower of which is adapted to be placed over a source of hot gases, a housing surrounding each of said plates, and means for hingedly connecting said plates to permit the latter to swing apart and to adjust themselves to varying thickness of the food between them, said housing having telescoping connecting passages adjustable to the separation between said plates to conduct hot gases from the space below said lower plate to that above said upper plate.

5. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and means below said lower plate for reducing the supply of heat thereto to equalize its temperature with that of the upper plate.

6. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and heat absorbing fins in the space above said upper plate for transmitting heat from said gases to said upper plate.

7. A toaster of the character described comprising in combination upper and lower metallic heating plates adapted to supply heat from their faces to the food between them, the lower of which is adapted to be placed over a source of hot gases, a housing surrounding each of said plates, means for hingedly connecting said plates to permit the latter to swing apart and to adjust themselves to varying thickness of the food between them, said housing having telescoping connecting passages adjustable to the separation between said plates to conduct hot gases from the space below said lower plate to that above said upper plate, and heat absorbing fins in the space above said upper plate for transmitting heat from said gases to said upper plate.

8. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and heat absorbing means including a plurality of channels above said upper plate for conducting said gases across said upper plate and for conducting the heat absorbed to said upper plate.

9. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and a series of channels across the entire operative surface of said upper plate for conducting gases uniformly across said upper plate.

10. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, heat absorbing fins in the space above said upper plate for transmitting heat from said gases to said upper plate, and means below said lower plate for reducing the supply of heat thereto to equalize its temperature with that of the upper plate.

11. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, said upper plate comprising an integral corrugated sheet formed to provide a flat toasting surface and a series of heat absorbing channels on the opposite face of said plate for conducting said hot gases and absorbing heat therefrom.

12. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, said upper plate comprising an integral corrugated sheet of metal having a high coefficient of conductivity formed to provide a continuous flat toaster surface on its under face and a plurality of heat absorbing channels through which said hot gases pass, the housing for said upper plate having a gas outlet remote from said passages to oblige said gases to pass across the entire upper plate to reach said outlet.

13. A toaster of the character described comprising in combination upper and lower metallic heating plates adapted to supply heat from their faces to the food between them, the lower of which is adapted to be placed over a source of hot gases, a housing surrounding each of said plates, and means for hingedly connecting said plates to permit the latter to swing apart and to adjust themselves to varying thickness of the food between them, said housing having telescoping connecting passages adjustable to the separation between said plates to conduct hot gases from the space below said lower plate to that above said upper plate, the housing for said lower plate having its passages along the sides of said plate and telescoping inside those for the upper plate, said lower plate having a flange along each side to baffle hot gases against entrance to the space between said plates.

14. A toaster of the character described comprising in combination upper and lower metallic heating plates adapted to supply heat from their faces to the food between them, the lower of which is adapted to be placed over a source of hot gases, a housing surrounding each of said plates and provided with passages for conducting hot gases from the space below the lower plate to that above said upper plate, and a thermostatic indicator exposed to the gases in the space above said upper plate.

15. A toaster plate for toasters of the character described comprising a sheet of metal having a high coefficient of conductivity formed with a plurality of corrugations with flat bottoms, said flat bottoms being contiguous to provide a flat toaster surface, said corrugations forming channels for absorbing heat from hot gases passing through said channels.

16. A bread toaster comprising two horizontal spaced surfaces hingedly connected together for receiving a slice of bread therebetween, means for supporting said surfaces above a source of heat supply exposed to the lower of said surfaces and means for directing the heat from said source substantially uniformly over both of said surfaces.

17. A bread toaster comprising two parallel vertically spaced surfaces, one of said surfaces having depending sidewalls thereby forming a combustion chamber for an open flame, and means for distributing the heat from said combustion chamber substantially uniformly over both of said surfaces.

18. A bread toaster comprising two parallel vertically spaced surfaces, means for supporting said surfaces above an open flame, deflecting means between the flame and the lower one of said surfaces, and flue means for directing the hot products of combustion over the top of the upper one of said surfaces whereby said upper and lower surfaces are maintained at approximately uniform temperatures.

19. A bread toaster comprising two parallel vertically spaced surfaces, means for supporting said surfaces above an open flame, a heat deflecting shelf comprising a pad of insulating material between the lower one of said surfaces and the open flame, and means for conducting the products of combustion from the vicinity of said shelf into contact with the upper one of said surfaces whereby said upper and lower surfaces are maintained at substantially uniform temperatures.

20. A bread toaster comprising opposed substantially horizontal vertically spaced surfaces for direct contact with a slice of bread, the lower one of said surfaces having sidewalls depending therefrom for the support thereof above an open flame, said lower surface having a flue extending upwardly therefrom for the products of combustion from said flame, the upper one of said surfaces having a flue to receive the products of combustion from the flue of the lower surface, walled passages for distributing the products of combustion from the last named flue over said upper surface, and a common stack for said walled passages.

21. The combination as set forth in claim 20 wherein said surfaces are relatively adjustable vertically to accommodate slices of different thicknesses and wherein said flues telescope during accommodation of the surfaces to relatively thin slices.

ORSON G. BURCH.